A. M. CASTILLO.
HAND SEEDER.
APPLICATION FILED JULY 29, 1918.
1,347,249.
Patented July 20, 1920.
2 SHEETS—SHEET 1.
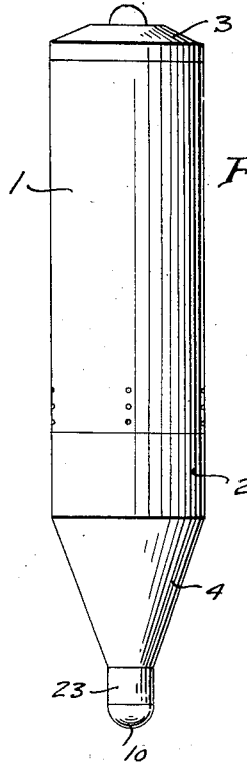
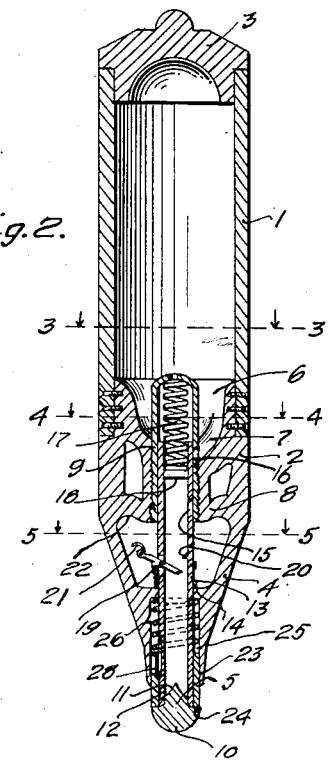
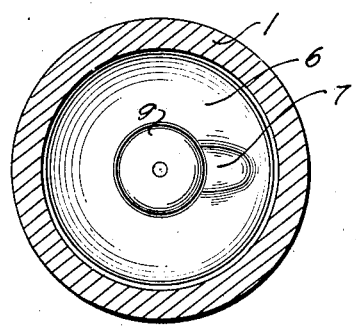
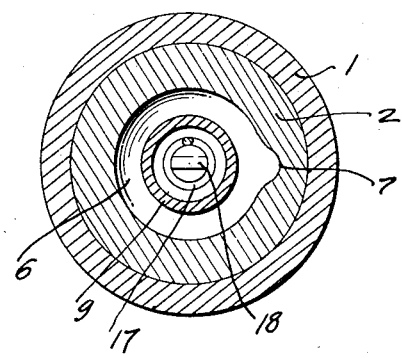
Inventor
A. M. Castillo.
Witnesses:—
By 
Attorneys

A. M. CASTILLO.
HAND SEEDER.
APPLICATION FILED JULY 29, 1918.

1,347,249.

Patented July 20, 1920.
2 SHEETS—SHEET 2.

Witnesses:—

Inventor
A. M. Castillo.
By
Attorneys.

UNITED STATES PATENT OFFICE.

AMANDO M. CASTILLO, OF ARINGAY, PHILIPPINE ISLANDS.

HAND-SEEDER.

1,347,249.  Specification of Letters Patent.  Patented July 20, 1920.

Application filed July 29, 1918. Serial No. 247,266.

*To all whom it may concern:*

Be it known that I, AMANDO M. CASTILLO, a citizen of the United States, residing at Aringay, in the Province of La Union, in the Philippine Islands, have invented certain new and useful Improvements in Hand-Seeders; and I do hereby declare the following to be a full, clear, and exact description of the invention, such as will enable others skilled in the art to which it appertains to make and use the same.

This invention relates to hand seeders.

The object of the invention is to construct a seed distributing device which is carried in the hand, and is actuated to distribute the seed by the action of drilling the seed hole. Thus, a seed tube which is disposed within a head is movable to traverse a seed receptacle and to take therefrom measured quantities of seed, and then upon a little stroke to drop the seeds into the ground.

With the above objects in view, and such others relating to the details of construction as may hereinafter appear, my invention will now be fully set forth and described, reference being had to the accompanying drawings.

In the drawings:—

Figure 1 is a side elevation of the planter or seeder,

Fig. 2 is a vertical section therethrough,

Fig. 3 is a section on line 3—3 of Fig. 2,

Fig. 4 is a section on line 4—4 of Fig. 2,

Figure 5:
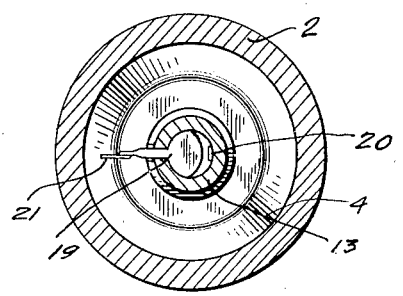
Fig. 5 is a section on line 5—5 of Fig. 2.
Figure 6:
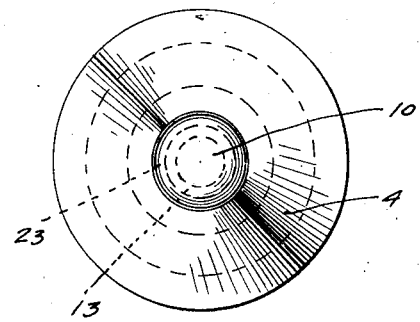
Fig. 6 is a lower end view.

Referring more particularly to the drawings, 1 represents a seed receptacle of preferably cylindrical formation, whose lower end is fitted over a head 2 which, in practice, will probably be a metal casting. The upper end of the seed receptacle is closed by means of a removable cap 3, said upper end of the receptacle 1 thus constituting the handle of the implement.

The head 2 is hollow, for the most part, and at its lower end terminates in a conical drilling point 4, through which a plunger head 5 operates. At its upper end, the head 2 is shaped into a hopper 6 which rounds downwardly and to one side into a seed spout 7, the shaping of the hopper 6 causing the formation of a transverse bearing web 8. The bearing web 8 is centrally apertured and threaded to receive therein the hood or cap 9, said hood or cap 9 coöperating with the walls of the hopper 6 to constitute the seed spout 7.

The plunger head 5 terminates at its lower end in a solid knob or drill point 10, and at its upper end in a plurality of inclined faces 11 which correspond in number to a plurality of seed delivery openings 12 which are formed in the seed tube 13 near its lower end. Said end rests upon a shoulder 24 on the head 5, and the tube extending upwardly therefrom, passes through a guide 14, and into the hood or cap 9, so that a port 15 in one side of the tube may register, at certain times, with a port 16 formed in the side of the hood or cap 9 at the lower end of the seed spout 7. A spring 17 is interposed between the upper closed end of the hood 9 and a cross piece 18 which spans the tube 13 at a suitable point, so that the plunger head 5 and the tube 13 are normally thrown down thereby. Mounted on a bearing at one side of the tube 13 is a measuring valve 19 which is adapted to close upwardly across the tube, striking against a stop 20 upon the opposite side of the column when the valve is in horizontal position so as to cut off the tube against the passage of seeds when the ports 15 and 16 are in registering relation. The valve 19, upon the upward movement of the tube 13 is closed by means of a lever arm 21 which strikes against a cam face 22 which is formed upon the lower side of the web 8, and upon the downward movement of the tube the valve drops by gravity and under the influence of the weight of the charge or measure of seed which has been admitted to the upper portion of the tube, so that the seeds may drop to the lower end of the tube.

Surrounding the tube 13 is a sleeve 23 which normally rests upon the shoulder 24 formed around the head 5, and is furthermore operative in an annular recess 25 in the lower end of the point 4. A spring 26 normally holds the sleeve 23 upon the shoulder 24, and upon each upward reciprocation of the head 5, the sleeve 23 is carried therewith. Mounted in a vertical slot 27 in the upper end of the sleeve 23 is a latch 28 whose lower end is shaped into a cam head 29 which rides in a cam groove 30 formed in the wall of the seed tube, and is adapted to be borne outward by the beveled upper end 34 of said groove. The upper end of the latch 28 terminates in a right angular hook or finger 31 which is thrown into a notch 32 formed in the wall of the recess 25 under the influence of a spring 33 surrounding the spindle of the latch 28.

Figure 7:
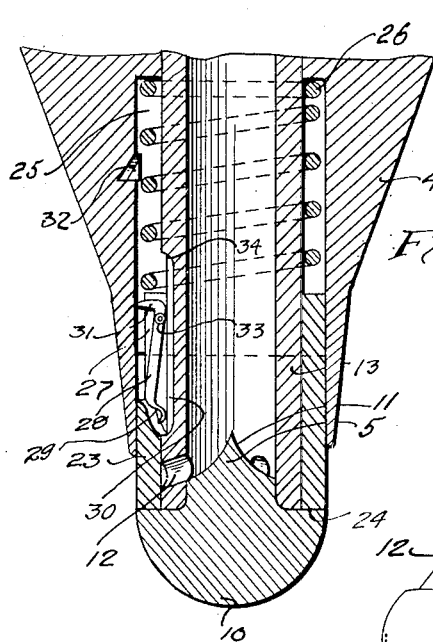
Fig. 7 is an enlarged sectional detail view of the latch mechanism.
Figure 8:
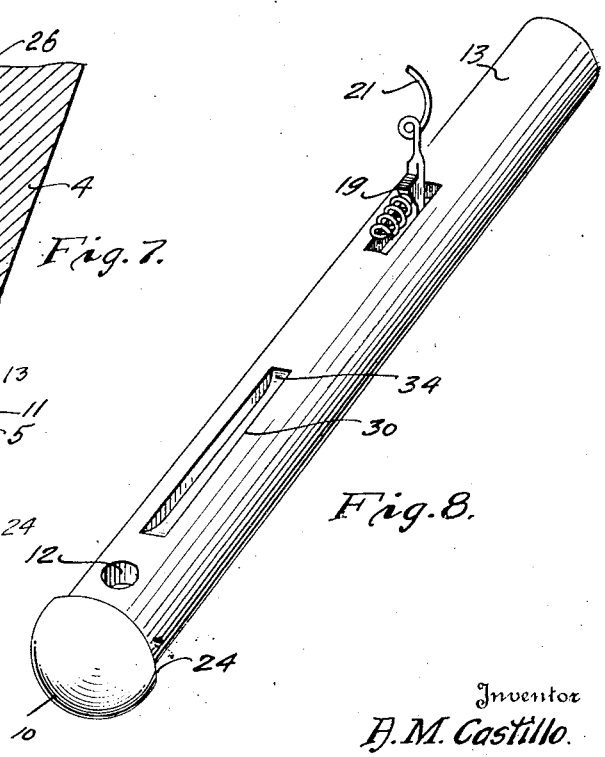
Fig. 8 is a perspective detail of the seed tube.

With the above construction of parts, the receptacle 1 is filled with seed and the cap 3 replaced and the operator grasps this end of the implement in his hand and proceeds to the point of use. Forcing the drill point or knob 10 into the earth, or passing it into an opening already made therein, no dirt may enter the openings because they are now closed by the sleeve 23; and pressure on said point causes the head 5 and tube 13 and all parts carried thereby to rise against the force of both springs 17 and 26. In such upward movement the lever arm 21 strikes the cam face 22 and the measuring valve 19 is closed across the interior of the tube, and therefore when the ports 15 and 16 come into register, only such a charge of seed can run out the spout 7 into the upper portion of the tube as is measured by the distance between the valve and the point of admission. Said upward movement also carries the sleeve 23 upward within the recess 25 until the hook or finger 31 of the latch 28 is thrown into engagement with the notch 32 by the spring 33. The operator now raises the handle portion of the implement and thus releases pressure on the knob or point 10, and the expansion of the spring 17 forces the tube downward relatively to the other parts. This movement immediately throws the ports 15 and 16 out of register so that no more seed is admitted, it next carries the pivot of the valve 19 downward until its arm 21 moves out of engagement with the cam face 22 and the valve drops open under the weight of the charge or measure of seed resting thereon, so that the seed falls into the lower portion of the tube. As this portion moves downward within the sleeve 23, which latter cannot move because it is yet latched, the delivery openings 12 pass the lower end of said sleeve and are uncovered, so that the charge of seed may run out. The final upward movement of the implement draws it out of the ground and leaves the charge of seed therein, and said final upward movement also draws the cam head 29 of the latch across the beveled end 34 of the cam groove 30 in the seed tube, so that the latch trips and the spring 26 expands to throw the sleeve downward onto the shoulder 24, whereby the parts are caused to resume the position shown in Fig. 7 at the time that the lower end of the implement is drawn out of the ground. The operator may now carry it to the next point of use without dropping any seed until the operation is repeated. Thus it will be seen that the action of this implement is entirely automatic, and furthermore it will be obvious that the planter provides a simple and effective seed distributer which operates with a minimum of effort, and which measures the seeds to be distributed in an automatic manner simultaneously with the drilling of the hole into which they are to be placed, so that merely by pressure upon the head of the device, the drill is made and the seeds are planted, after which a simple pressure with the foot will cover the seeds.

What I claim as my invention is:—

1. In a hand seeder, the combination with a body having at its upper portion a seed hopper and spout and at its lower portion a tubular guide recessed at its lower end and notched in the wall of the recess; of a seed tube slidably mounted in said guide, its upper and lower ends being closed and its wall having delivery openings just above its lower end and an inlet port adapted to communicate with said spout when the tube is raised, a spring pressing said tube normally downward, a shoulder around its lower end beneath its delivery openings, a sleeve slidable around said lower end above the shoulder and within said recess, a spring bearing said sleeve normally downward, a latch on the sleeve adapted to engage said notch when the sleeve is raised by the rise of the tube, and means on the tube for tripping said latch by the descent of the tube.

2. In a hand seeder, the combination with a body having at its upper portion a seed hopper and spout and at its lower portion a tubular guide recessed at its lower end and notched in the wall of the recess; of a seed tube slidably mounted in said guide, its upper and lower ends being closed and its wall having delivery openings just above its lower end and an inlet port adapted to communicate with said spout when the tube is raised, a spring pressing said tube normally downward, a shoulder around its lower end beneath its delivery openings, a sleeve slidable around said lower end above the shoulder and within said recess, a spring bearing said sleeve normally downward, said sleeve being slotted in one side at its upper end and the tube having an upright cam grove opposite the slot, a latch pivoted in said slot and having an outstanding hook at is upper end, and a spring turning the latch normally in a direction to engage the hook in said notch when the sleeve is raised, the descent of the tube causing the upper end of its cam groove to trip the latch, as described.

3. In a hand seeder, the combination with a body having at its upper portion a seed hopper and spout and at its lower portion a tubular guide, and a hood screwed into the upper portion of said guide and rising into the hopper, its upper end being closed and its wall having a port communicating with said spout; of a seed tube slidable within the hood and the lower portion of said guide and having a port adapted to communicate with that mentioned when the tube is raised, a cross piece within the tube, an expansive spring between it and the upper end of the hood, a drill point closing the lower end of the tube and having a shoulder projecting beyond its wall, said wall having delivery openings just above the shoulder, the lowermost portion of said guide having an annular recess, a sleeve slidably mounted therein above said shoulder, a spring bearing it normally downward, and latch mechanism supporting it when raised but tripped by the descent of the tube.

4. In a hand seeder, the combination with a tubuar handle having a hopper and spout at its upper portion, a guide at its lower portion, and a cam face between; of a seed tube reciprocably mounted in said guide and having closed ends projecting into the hopper and below the handle and inlet and outlet openings adjacent its respective ends, means automatically controlling said outlet openings by the reciprocation of the handle of the tube, a valve pivoted to swing across the tube between its inlet and outlet, and an arm projecting from the valve and coacting with said cam face as the tube rises to admit a charge of seed onto the closed valve, the valve opening to drop said charge as the tube descends.

5. In a seeder, the combination with a handle having a hopper and seed spout, below the same, an internal web with a central opening and a cam face at one side of the same, and at a lower point a guide and a recess; of a seed tube slidable within the lower portion of said handle and projecting below its lower end and there having side delivery openings, the tube having an inlet port adapted to register with said spout when the tube is raised, a hood closing the upper end and a drill point closing the lower end of said tube, yielding means bearing it normally downward, a sleeve slidable in said recess and around the tube for closing its delivery openings, latch mechanism for holding the sleeve raised within the recess, means on the tube for tripping said latch when the tube descends, a valve movably mounted between the inlet and outlet openings in the tube, and operating mechanism coacting with said cam face to close the valve on the rise of the tube and permit it to open on the descent thereof.

In testimony whereof, I affix my signature in the presence of two witnesses.

AMANDO M. CASTILLO.

Witnesses:
   Eduardo Garcia,
   Pablo Reyes.